Patented Aug. 26, 1924.

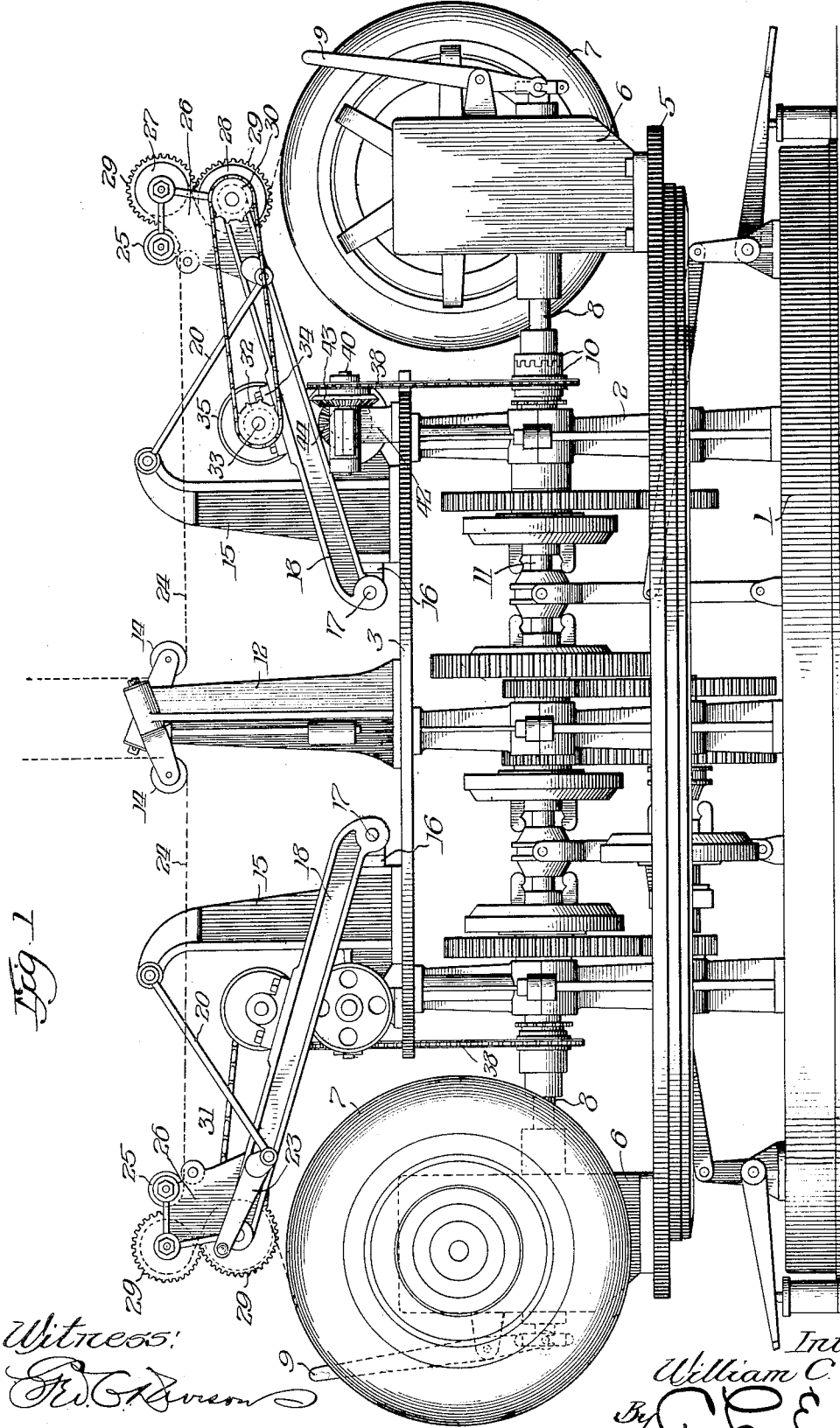

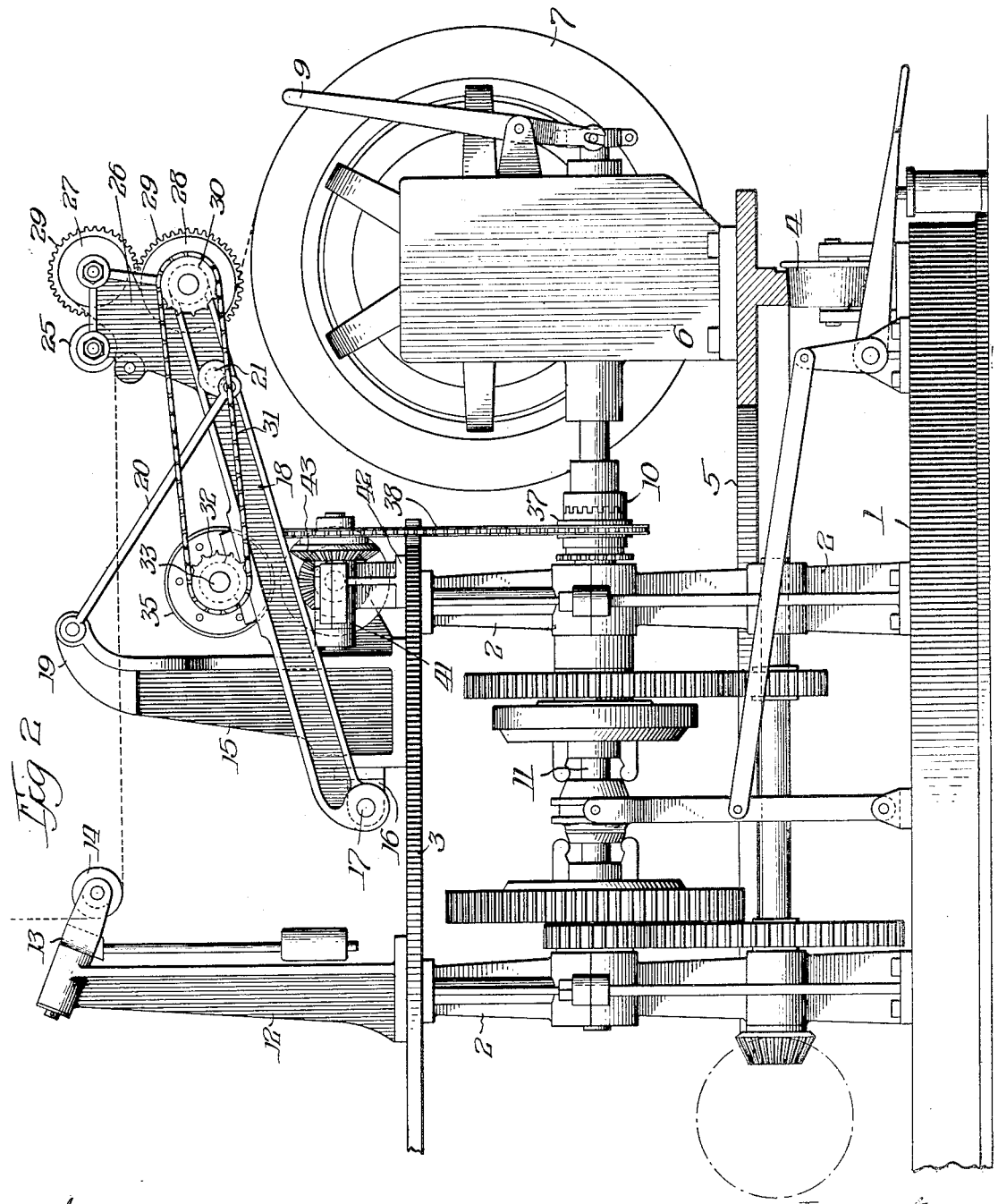

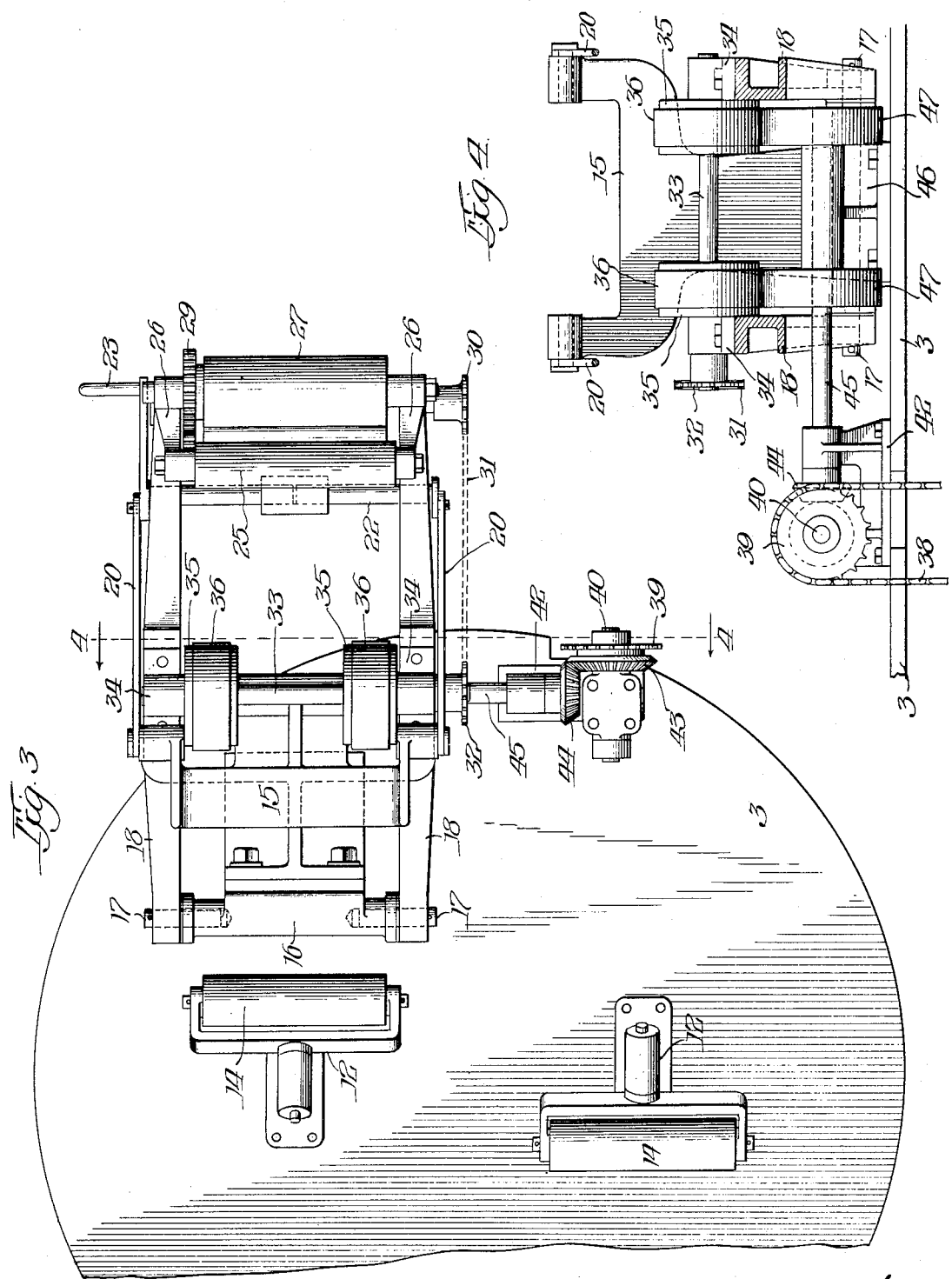

1,506,456

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-MAKING MACHINE.

Application filed January 2, 1920. Serial No. 348,903.

*To all whom it may concern:*

Be it known that I, WILLIAM C. STEVENS, a citizen of the United States, residing at Akron, in the county of Summit, State of Ohio, have invented certain new and useful Improvements in Tire-Making Machines, of which the following is a specification.

This invention relates to a mechanism for manufacturing pneumatic tires from layers or plies of rubber impregnated fabric, and is designed as an improvement on the tire making machine shown and described in my prior application, Serial No. 256,429, filed October 1, 1918.

The present invention relates particularly to the fabric stretching or elongating mechanism. It is the purpose of the present invention to eliminate certain elements in the machine of the former application simplifying the construction and making it more efficient and practical. I propose to perform the stretching operation by driving a stretching or tension roller at a speed less than the speed of the core by positive gearing, the driving or retarding mechanism operated in timed relation to the speed of the core, whereby a definite and determined percentage of stretch is imparted to the fabric.

In the drawings accompanying this application is shown one form of the invention, it being understood that it is simply an example of the manner in which the invention may be embodied, and is subject to changes and modifications without departure from the essentials thereof.

The invention is shown in combination with certain parts of the machine of the prior application referred to, but it may be combined with other forms of tire making machines as will be understood. The machine forming the basis of the present embodiment of the invention comprises a central stationary table, or platform, on which the fabric stretching mechanism is carried and a movable table or carriage on which the cores are carried, the cores being moved from one position to another about the central table, after each successive operation of forming the tire is completed, a separate fabric stretching mechanism being provided at the several stations at which fabric is applied to the core.

In the drawings:

Fig. 1 is a side elevation of the tire making machine, certain elements having been omitted for the sake of clearness.

Fig. 2 is an enlarged view of one of the fabric applying units.

Fig. 3 is a plan view.

Fig. 4 is a section on the line 4—4 of Fig. 3.

In the drawings the base of the machine is indicated by the numeral 1, from the central portion of which rise a plurality of standards 2, supporting the central stationary table or platform 3. Supported on the base 1 in any preferred manner, such as rollers or casters 4, is a movable platform or revoluble turntable 5 on which are carried a number of stanchions or core supports 6 each of which rotatably holds a core 7. The cores are designed to be rotated at suitable speeds by shafts 8 shiftable longitudinally by handles 9 so as to engage or disengage clutch members 10, through which rotary movement is transmitted to the core by main driving shafts 11 operated at fast or slow speeds in any desirable manner.

In the center of the platform 3 rise standards 12 in the upper ends of which are mounted on swivels 13 fabric guiding rollers 14. Opposite each core support in the positions shown is mounted an upright 15 to the lower rear side of which is connected a lug 16. Pivotally supported on this lug at 17 is a rocking framework comprising a pair of swinging arms 18 which extend out over the core. The upper ends of the standards 15 are curved as at 19 and each carries a pair of suspension rods 20 which are pivotally connected to plates or arms 21 carried at the sides of the arms 18 on a transverse shaft 22 journaled in the arms. One end of the shaft 22 carries an operating handle 23. By means of the handle the arms 18 may be raised to permit the turntable 5 to be moved to advance the cores through the machine, or be lowered to bring the tension mechanism close to the core while the fabric is applied, and to bring the stretching mechanism in operative position as will be explained.

The fabric is indicated by the dotted lines 24 and may be drawn from any source passing first under the guide roller 14 and then under a guide roller 25 rotatably mounted in plates 26 on the ends of the arms 18. From the roller 25 the fabric passes around the rollers 27 and 28 which constitute the stretching rollers for the fabric, the roller 27 being located above the roller 28 and connected to it by gears 29, the gearing being so arranged as to produce a slight stretch between these two rollers.

The roller 28 is located directly over the core and, when the arms 18 are lowered, is so close to the core that the fabric passes directly to it without opportunity for the formation of wrinkles. To the shaft of the roller 28 is attached a sprocket 30 over which travels a chain 31 reaching to a sprocket 32 carried on a shaft 33 which is journaled in bearings 34 mounted on the upper sides of the arms 18 at a point near the outer edge of the platform 3.

The shaft 33 carries at suitable points, preferably at two points adjacent the arms 18 retarding or checking rollers 35, the outer surfaces of which are composed of friction material 36.

At any preferred point in the driving mechanism, preferably on the drive shaft 11, is carried a sprocket 37 around which passes a sprocket chain 38 leading to a second sprocket wheel 39, mounted on the end of a short shaft 40, rotatably carried in a bearing 41, which is part of an L-shaped bracket 42 secured to the top of the table 3. Connected to the sprocket 39 is a bevel pinion 43 which meshes with a bevel pinion 44 carried on the end of a jack-shaft 45 received in a bearing in the bracket 42 and in a long bearing on a bracket 46 secured to the top of the platform or table 3.

Secured to the shaft 45 at the sides of the bracket 46 are pulleys 47 which are located under the rollers 35. When the arms 18 are raised in the position shown in Fig. 2 the rollers 35 and 47 are out of contact, but when the arms are lowered, the rollers are in frictional engagement, the rollers 47 supporting the framework. The gearing between the shaft 11 and the core on the one hand, and the shaft 11 and the stretching or tension rollers 28, through the shaft rollers 47 and 35, on the other is such that the roller 28 revolves at a peripheral speed definitely fixed at less than the peripheral speed of the core. By this means a definite percentage of elongation or stretch is imparted to the fabric as it goes on to the core.

It will be further noted that the weight of the arms 18, when the frame is lowered, will hold the rollers 35 in contact with the pulleys 47 so that a firm frictional engagement is assured. The arrangement is such that the pull on the fabric in being drawn on to the core by the rotation of the core pulls the framework 18 down causing close contact between the rollers, the result of which is that the greater the pull on the fabric, the closer will be the contact between the rollers. This arrangement will effectively prevent any slipping between the two rollers with consequent errors in the stretch. In this respect the device is similar to that disclosed in my prior application Serial No. 855,972, filed August 10, 1914.

By the mechanism shown it will be seen that an efficient and easily operated tension device is provided. As the cores are presented to the stretching mechanisms in order, the operator by means of a handle 23 lowers the framework comprising the arms 18 and connected parts until the rollers 35 and 47 are in contact. He then attaches the leading end of the fabric to the core and starts the rotation of the core through the drive shaft 11. As the core rotates it draws the fabric through the tension rollers, which, being retarded in definite relation to the rotation of the core through the mechanism described, serves to stretch the fabric a definite percentage of its original length. When the required amount of fabric has been applied to the core, the rotation is stopped and the fabric severed between the roller 28 and the core. The splice is then finished and the framework is raised. The core is now free to be turned without imparting motion to the fabric rollers for shaping the fabric to the core or for other purposes, and the turntable 3 can be moved to bring the next core in position. The arrangement of the two stretching devices at different positions about the platform 3 enables the differing widths of fabric under and over the bead to be applied without changing or rethreading the fabric. The number of stretching mechanisms may be increased if it is found desirable, the plurality of mechanisms permitting slight variations in the percentage of stretch to compensate for the increase in diameter of the tire as the plies accumulate.

Changes and modifications may be made within the scope of the claims and such as fall within the spirit of the invention are intended to be covered herein.

I claim:

1. A machine for the purpose set forth comprising a core support, a pivoted framework, means for raising and lowering said framework, a tension roller in said framework, a fixed pulley located beneath the framework for supporting said framework in its lowermost position, and tension roller retarding means driven through said pulley.

2. A machine for the purpose set forth comprising a core support, a pivoted framework, a tension roller in said framework, a retarding roller also in said framework, driving mechanism connecting the said rollers, a table, a pulley on said table located under the retarding roller and means to drive said pulley.

3. A machine for the purpose set forth comprising a core support, means for rotating a core, a movable framework, a tension roller in said framework, a retarding roller also in said framework, driving mechanism connecting the said rollers, a pulley on said machine beneath the retarding roller supporting the framework, and means to drive said pulley in definite relation to the rotation of the core.

4. A machine for the purpose set forth, comprising a core support, means for rotating the core, a movable framework, a tension roller in said framework, a retarding roller in said framework, driving mechanism connecting the said rollers, a pulley on said machine driving connections between the pulley and the core rotating means and means for moving the framework toward and away from said pulley.

5. A machine for the purpose set forth comprising a core support, means for rotating the core, a pulley driven by the core rotating means, a pivoted framework on said machine, a tension roller carried in said framework, a retarding roller also carried in said framework, and means for lowering the framework to bring the retarding roller in contact with the pulley.

6. A machine for the purpose set forth comprising a core support, means for rotating the core, a pulley driven by the core rotating means, a pivoted framework on said machine, a tension roller carried in said framework, a retarding roller also carried in said framework, means for supporting the framework with the retarding roller out of contact with the pulley, and means to lower the framework so that its weight is supported by the retarding roller resting on the pulley.

7. A machine for building tire carcasses, comprising a stationary table, a movable table, a plurality of core supports on said movable table and a plurality of tension devices on said stationary table, means for rotating the cores, positive driving mechanisms between a core support and each tension device and releasable clutch devices in said mechanisms.

8. In a tire making machine, a stationary table, and a movable core support, a drive shaft, connections from said drive shaft to the core support, a tension roller, connections independent of the first named connections from the drive shaft to the tension roller and releasable mechanisms in both said connections.

WILLIAM O. STEVENS.